US006271158B1

(12) United States Patent
Xue et al.

(10) Patent No.: US 6,271,158 B1
(45) Date of Patent: Aug. 7, 2001

(54) COMPOSITE SEALANT MATERIALS FOR SOLID OXIDE FUEL CELLS

(75) Inventors: Liang A. Xue; James Piascik, both of Randolph; Jean Yamanis, Morristown, all of NJ (US); Gregory Lear, Redondo Beach, CA (US); James Powers, Raritan; Daniel Dalfonzo, South Plainfield, both of NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/351,392

(22) Filed: Jul. 13, 1999

Related U.S. Application Data
(60) Provisional application No. 60/093,613, filed on Jul. 21, 1998.

(51) Int. Cl.⁷ .................................. C03C 8/16; C03C 8/18
(52) U.S. Cl. .................................. 501/19; 501/15; 501/17; 501/20; 501/21; 501/26; 501/32; 429/35; 429/36; 429/174; 429/184
(58) Field of Search .................................. 501/15, 17, 19, 501/20, 21, 26, 32; 429/35, 36, 174, 184

(56) References Cited

U.S. PATENT DOCUMENTS

| 3,888,686 | 6/1975 | Ellis . | |
|---|---|---|---|
| 4,311,772 | 1/1982 | Herczog . | |
| 4,417,913 | * 11/1983 | Davis et al. | 501/67 |
| 4,774,154 | 9/1988 | Singelyn et al. . | |
| 5,021,307 | * 6/1991 | Brow et al. | 429/184 |
| 5,110,691 | 5/1992 | Krasij et al. . | |
| 5,453,331 | 9/1995 | Bloom et al. . | |

* cited by examiner

*Primary Examiner*—Elizabeth D. Wood
(74) *Attorney, Agent, or Firm*—William J. Zak, Jr. Esq.

(57) ABSTRACT

A sealant for a solid oxide fuel cell comprises a glass material that acts as a matrix, with the glass material being present between about 40 to 90 wt. %. A gap-filler material is also in the sealant and selected from the group consisting of a metal material and a ceramic material, with the gap-filler material being present between about 10 to 60 wt. %. The sealant can seal a gap as large as about 3 mm.

21 Claims, No Drawings

US 6,271,158 B1

COMPOSITE SEALANT MATERIALS FOR SOLID OXIDE FUEL CELLS

CROSS-REFERENCE TO RELATED APPLICATIONS

The application claims the benefit of U.S. Provisional application No. 60/093,613, filed Jul. 21, 1998

BACKGROUND OF THE INVENTION

The present invention generally relates to sealants for ceramics and, more particularly, to a composite sealant for solid oxide fuel cells that provides improved thermal matching and gap holding capacity.

A fuel cell is basically a galvanic conversion device that electrochemically reacts a fuel with an oxidant within catalytic confines to generate a direct current. A fuel cell typically includes a cathode material which defines a passageway for the oxidant and an anode material which defines a passageway for the fuel. An electrolyte is sandwiched between and separates the cathode and anode materials.

The fuel and oxidant fluids are usually gases and are continuously passed through separate cell passageways. Electrochemical conversion occurs at or near the three-phase boundary of the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Specifically, in a solid oxide fuel cell (SOFC), the fuel reacts with oxide ions on the anode to produce electrons and water, the latter of which is removed in the fuel flow stream. The oxygen reacts with the electrons on the cathode surface to form oxide ions that diffuse through the electrolyte to the anode. The electrons flow from the anode through an external circuit and then to the cathode, with the circuit being closed internally by the transport of oxide ions through the electrolyte.

In a SOFC, the electrolyte is in a solid form. Typically, the electrolyte is made of a nonmetallic ceramic, such as dense yttria-stabilized zirconia (YSZ) ceramic, that is a nonconductor of electrons which ensures that the electrons must pass through the external circuit to do useful work. As such, the electrolyte provides a voltage buildup on opposite sides of the electrolyte, while isolating the fuel and oxidant gases from one another. The anode and cathode are generally porous, with the anode oftentimes being made of nickel/YSZ cermet and the cathode oftentimes being made of doped lanthanum manganite. In the solid oxide fuel cell, hydrogen or a hydrocarbon is commonly used as the fuel, while oxygen or air is used as the oxidant.

An individual SOFC cell usually generates a relatively small voltage. Thus, to achieve higher voltages that are useful, the individual electrochemical cells are connected together in series to form a stack. Electrical connection between cells is achieved by the use of an electrical interconnect between the cathode and anode of adjacent cells. Also typically included in the stack are ducts or manifolding to conduct the fuel and oxidant into and out of the stack.

Whether in the form of a stack or individual cells, it is important that the fuel and oxidant be kept separate from one another. Otherwise, there would be less efficiency in producing the exchange of ions across the electrolyte, as well as a potential for explosions. Consequently, sealants have been used to seal different portions of a SOFC stack, such as at the edges and where manifolds must be affixed to the stack.

Generally, the sealant should exhibit one or more of the following characteristics. The sealant has a relatively high coefficient of thermal expansion (CTE) to match that of the stack components, including the cells, interconnects, and manifold materials. Typically, those components have CTE's ranging from about 9 to $15 \times 10^{-6}/°$ C. The sealant also has a desirable viscosity such that the sealant is fluid enough to seal gaps at the sealing/assembly temperature and be viscous enough at the cell operating temperature (about 700–1000° C. for an SOFC) so that gaps are kept sealed under gas pressure differentials. Also during fuel cell operating conditions and environments, the sealant should be stable both thermally (i.e., negligible crystallization) and chemically (i.e., negligible weight loss, minimum reaction with stack and manifold materials).

Various attempts have been made to achieve the above sealant characteristics, in addition to others. For example, in U.S. Pat. No. 4,774,154, a sealant was provided for a fuel cell that operated at about 400° F. The sealant comprised an elastomer, such as a flourinated hydrocarbon. Added to the elastomer was a reinforcing filler to improve processing and molding characteristics, such as carbon black. A blowing agent (such as azodicarbonamide), blowing agent promoter, and acid acceptor (to absorb acid during curing) were additionally provided in the sealant. However, such sealant would have little, if any, utility in the context of an SOFC which operates at temperatures much higher than 400° F.

Likewise, the sealant in U.S. Pat. No. 5,110,691 was particularly useful for fuel cells operating at about 140 to 250° F. The sealant comprised butyl rubber and ethylene propylene. A filler was added to extend sealant life, as well as improve creep and strength properties. An anti-oxidant was used in the sealant to improve stability, and a thickener was used to improve viscosity. Again, however, such sealant would evidently not be useful at operating temperatures well in excess of 250° F.

A sealant claimed to be useful for an SOFC is found in U.S. Pat. No. 5,453,331. Therein, it was claimed that commonly used silica based sealants had higher softening temperatures than the boron oxide based sealant of the invention. It was also believed that a low silica content avoided formation of volatile silicon monoxide in the anode side of the cell. Accordingly, the silica content was taught to be kept between about 3 to 20 mol %. Alumina was added to retard crystallization and lanthanum oxide was added to modify the viscosity. A curing agent was also provided in the sealant to improve strength. While apparently providing advantages, it can be seen that multiple steps and multiple reactants are required. Also, the two main ingredients of the sealant, SrO and $La_2O_3$, are relatively expensive materials, which increases the cost of the sealant. Further, there seems to be no suggestion that the sealant is capable of providing a seal to relatively large gaps on the order of about >1 mm.

As can be seen, there is a need for an improved sealant, including ones for ceramics and solid oxide fuel cells. Also needed is a sealant that can be used at operating temperatures of about 700–1000° C. A sealant is needed that can provide improved gap holding capacity for gaps greater than about 1 mm. A further need is for a low cost sealant that is relatively easy to manufacture as a result of requiring fewer components and less reaction steps.

SUMMARY OF THE INVENTION

A sealant for a solid oxide fuel cell according to the present invention comprises a glass material that acts as a matrix, with the glass material being present between about 40 to 90 wt. %; and a gap-filler material selected from the group consisting of a metal material and a ceramic material, with the gap-filler material being present between about 10 to 60 wt. %, whereby the sealant can seal a gap as large as about 3 mm.

Also provided by the present invention is a method of sealing a solid oxide fuel cell, comprising the steps of mixing a glass powder material with a metal powder material in a weight ratio between about 10:1 to 2:3; producing a composite sealant powder; and applying the composite sealant powder to the solid oxide fuel cell.

These and other features, aspects and advantages of the present invention will become better understood with reference to the following description and claims.

DETAILED DESCRIPTION OF THE INVENTION

The present invention provides a sealant that is particularly useful for sealing solid oxide fuel cells. But it should be understood that the sealant is not so limited in application and may be used in other applications, such as ceramics in general. Likewise, although the method of the present invention can be used to seal solid oxide fuel cells, the method may be useful in other contexts. While the sealant and method of the present invention can be used to seal gaps of varying sizes, there is greater utility in gaps that are at least about 1 mm and not greater than about 3 mm.

The sealant of the present invention comprises a matrix material and a gap-filler material. In contrast to the prior art, the filler material in the present invention is not just for the purpose of improving creep and strength properties. Rather, in this instance, the gap-filler material primarily improves the gap holding capacity, as well as the coefficient of thermal expansion. The matrix material is in this embodiment a glass material. The matrix or glass material is preferably present at about 40 to 90 wt. %. More preferably, the glass material is present at about 70 wt. %. Below about 40 wt. %, the resulting sealant tends to be too viscous to work with during the sealing step, while above about 90 wt. % the resulting sealant tends to be too fluid to hold large gaps under differential gas pressure. With the above percentages of glass material, the gap-filler material is preferably present between about 10 to 60 wt. % and more preferably at about 30 wt. %. Below and above the foregoing gap-filler ranges, the above-mentioned disadvantages in the resulting sealant tend to occur.

The composition of the glass material may vary. Yet, it is preferable that the glass material comprises about 50–70 wt. % $SiO_2$, 10–25 wt. % ZnO, 5–20 wt. % $K_2O$, 0–15 wt. % $Na_2O$, 0–8 wt. % $Li_2O$, 0–8 wt. % BaO, 0–5 wt. % $ZrO_2$, 0–3 wt. % CaO, and 0–2 wt. % MgO. More preferable compositions of the glass material include about 56 wt. % $SiO_2$, 21 wt. % ZnO, 10 wt. % $K_2O$, 8 wt. % $Na_2O$, and 4 wt. % $ZrO_2$. Alternatively, the glass material can include about 60 wt. % $SiO_2$, 14 wt. % ZnO, 16 wt. % $K_2O$, 4 wt. % $Li_2O$, 4 wt. % BaO, 0.3 wt. % CaO, and 0.1 wt. % MgO. Small amounts of impurites (less than about 1 wt. % may be present), such as B, P, Fe, Ge, Sb, W and Pb, may be present in the above glass materials. Rather than making the above glass compositions, they can be commercially obtained, such as in the form of Corning 3103 and Corning 4060 made by Corning, Inc.

As with the glass material, the composition of the gap-filler material can vary. The filler may comprise a retal composition, a ceramic composition, and combinations thereof. An example of a useful ceramic is yttria stabilized zirconia which contains about 8 mol % yttria. Examples of metal compositions may contain about 12–77 wt. % Ni, 3–65 wt. % Fe, 16–23 wt. % Cr, 0–15 wt. % W, 0–6 wt. % Co, 0–5 wt. % Al, 0–3 wt. % Mo, 0–3 wt. % Mn, 0–2 wt. % Si, and 0–1 wt. % Y. Preferably, however, one metal composition that acts as the filler comprises about 77 wt. % Ni, 3 wt. % Fe, 16 wt. % Cr, 4.5 wt. % Al, and less than 1 wt. % Y. Another preferred metal filler material comprises about 57 wt. % Ni, 3 wt. % Fe, 22 wt. % Cr, 14 wt. % W, 5 wt. % Co, 0.3 wt. % Al, 2 wt. % Mo, 0.5 wt. % Mn, and 0.4 wt. % Si. Like with the glass material, the metal filler material may be commercially obtained rather than made from the individual components. Thus, Haynes 214 and Haynes 230 made by Homogeneous Metals, Inc. can be used.

In preferred embodiments, if the glass material used includes about 56 wt. % $SiO_2$, 21 wt. % ZnO, 10 wt. % $K_2O$, 8 wt. % $Na_2O$, and 4 wt. % $ZrO_2$, then it is preferred that the metal gap material includes about 77 wt. % Ni, 3 wt. % Fe, 16 wt. % Cr, 4.5 wt. % Al, and less than 1 wt. % Y. If the glass material used includes about 60 wt. % $SiO_2$, 14 wt. % ZnO, 16 wt. % $K_2O$, 4 wt. % $Li_2O$, 4 wt. % BaO, 0.3 wt. % CaO, and 0.1 wt. % MgO, then the metal material should preferably include about 57 wt. % Ni, 3 wt. % Fe, 22 wt. % Cr, 14 wt. % W, 5 wt. % Co, 0.3 wt. % Al, 2 wt. % Mo, 0.5 wt. % Mn, and 0.4 wt. % Si. Similarly, if the glass material is Corning 3103, then it is preferred to use Haynes 230 as the gap-filler material. If Corning 4060 is used as the glass, then Haynes 214 is preferred for the gap-filler.

The above glass material and gap-filler material are preferably in powder form. These powders can be combined in at least one of two methods to eventually seal an SOFC or other apparatus/material. In a first preferred method, the glass powder (e.g., Corning 4060) is directly mixed with the metal powder (e.g., Haynes 214 and/or ceramic powders in a desired ratio. The resulting composite sealant powder can then be applied onto the SOFC as the sealant directly in the form of a powder. Alternatively, the composite sealant powder can be applied as a paste onto the SOFC after the sealant powder is blended with a solvent/binder system (e.g., terpineol and Heraeus V-006 made by Heraeus, Inc.) into a paste.

A second preferred method of sealing an SOFC or other apparatus is to take the glass powder and make it into a paste. This is accomplished by mixing the glass powder with a solvent/binder system, such as that described above. The metal powders and/or ceramic powders are then added to make composite sealant paste.

The resulting sealant by either method is characterized by a glass transition temperature between about 500 to 800° C., in addition to a coefficient of thermal expansion between about 8 to $13 \times 10^{-6}$/° C. at a temperature between about 20 to 800° C.

EXAMPLES

In a first example, 10 grams of Corning 4060 glass powder was blended with 2.5 grams of Haynes 214 powder in an agate mortar to make the composite sealant mixture. The sealant could then be applied to the places in the fuel stack to be sealed and then heated to a temperature higher than the softening point of the glass (e.g., 900° C.) in the sealant to make the seal.

In a second example, 40 grams of Corning 3103 glass powder was blended with 10 grams of a solvent/binder system (alpha-terpineol/Heraeus V-006, 55:45 ratio) to make a paste. To 10 grams of this paste, 1.4 grams of stainless steel 316L powder made by ANVAL was added and mixed to make the composite sealant mixture.

For a third example, 10 grams of the Corning 3103 glass paste from Example 2 above was added to 1.5 grams of Haynes 230 powder and 0.5 grams of 8 mol. % yttria stabilized zirconia powder. The above was mixed to make the composite sealant.

A fourth example included 50 grams of Corning 4060 glass powder blended with 12.5 grams of the solvent/binder system (alpha-terpineol/Heraeus V-006, 55:45 ratio) to make a paste. To 7 grams of this paste, 2.8 grams of Haynes 214 powder was added and mixed to make the composite sealant.

The fifth example used 5 grams of the Corning 4060 glass paste from Example 4 with 4 grams of Haynes 214 powder. They were mixed to make the composite powder.

As can be appreciated by those skilled in the art, the present invention provides an improved sealant that can be particularly useful for sealing an SOFC. The sealant provides improved gap holding capacity, as well as a high coefficient of thermal expansion. Also provided by the present invention is a method of making a sealant and then sealing an SOFC that reduces the number of processing steps and reactants. And because the present invention employs inexpensive material $SiO_2$ as the main ingredient in the sealant and avoids the use of relatively expensive materials such as SrO and $La_2O_3$, substantial cost savings advantage can be realized.

It should be understood, of course, that the foregoing relates to preferred embodiments of the invention and that modifications may be made without departing from the spirit and scope of the invention as set forth in the following claims.

We claim:

1. A composite sealant, comprising:
   a glass material that acts as a matrix, said glass material being present at least at about 40 wt. % ; and
   a filler material that acts as a gap-filler, said filler material being present at least at about 10 wt. %, with said filler material comprising Ni, Fe, and Cr.

2. The sealant of claim 1, wherein said glass material is present at not more than about 90 wt. %.

3. The sealant of claim 1, wherein said glass material comprises $SiO_2$, ZnO, and $K_2O$.

4. The sealant of claim 1, wherein said filler material is present at not more than about 60 wt. %.

5. The sealant of claim 1, wherein said filler material is selected from the group consisting of metals, ceramics, and combinations thereof.

6. A sealant for a solid oxide fuel cell, comprising:
   a glass material that acts as a matrix, said glass material being present at not more than about 90 wt. %; and
   a filler material that acts as a gap-filler, said filler material being present at not more than about 60 wt. %, with said filler material comprising about 12–77 wt. % Ni, 3–65 wt. % Fe. 16–23 wt. % Cr, 0–15 wt. % W, 0–6 wt. % Co, 0–5 wt. % Al, 0–3 wt. % Mo, 0–3 wt. % Mn, 0–2 wt. % Si, and 0–1 wt. % Y;
   whereby said sealant can seal a gap greater than about 1 mm.

7. The sealant of claim 6, wherein said glass material is present at least at about 10 wt. %.

8. The sealant of claim 6, wherein said glass material comprises about 50–70 wt. % $SiO_2$, 10–25 wt. % ZnO, 5–20 wt. % $K_2O$, 0–15 wt. % $Na_2O$, 0–8 wt. % $Li_2O$, 0–8 wt. % BaO, 0–5 wt. % $ZrO_2$, 0–3 wt. % CaO, and 0–2 wt. % MgO.

9. The sealant of claim 6, wherein said filler material is present at least at about 10 wt. %.

10. A sealant for a solid oxide fuel cell, comprising:
    a glass material that acts as a matrix, said glass material being present between about 40 to 90 wt. %; and
    a gap-filler material selected from the group consisting of a a ceramic material and metal material comprising Ni, Fe, and Cr, said gap-filler material being present between about 10 to 60 wt. %,
    whereby said sealant can seal a gap as large as about 3 mm.

11. The sealant of claim 10, wherein said sealant is characterized by a glass transition temperature between about 500 to 800° C.

12. The sealant of claim 10, wherein said sealant is characterized by a coefficient of thermal expansion between about 8 to $13 \times 10^{-6}$/° C. at a temperature between about 20 to 800° C.

13. The sealant of claim 10, wherein said glass material is present at about 70 wt. %.

14. The sealant of claim 10, wherein said gap filler material is present at about 30 wt. %.

15. The sealant of claim 10, wherein 77 wt. % Ni, 3 wt. % Fe, 16 wt. % Cr, 4.5 wt. % Al, and less than 1 wt. % Y.

16. The sealant of claim 10, wherein said gap-filler material comprises about 57 wt. % Ni, 3 wt. % Fe, 22 wt. % Cr, 14 wt. % W, 5 wt. % Co, 0.3 wt. % Al, 2 wt. % Mo, 0.5 wt. % Mn, and 0.4 wt. % Si.

17. The sealant of claim 10, further comprising a solvent/binder material.

18. A sealant for a solid oxide fuel cell, comprising:
    a glass material that acts as a matrix, said glass material being present at not more than about 90 wt. % ; and
    a filler material that acts as a gap-filler, said filler material being present at not more than about 60 wt. %, with said filler material comprising about 8 mol.% yttria stabilized zirconia.

19. The sealant of claim 18, wherein said glass material is present at least at about 10 wt. %.

20. The sealant of claim 18, wherein said glass material comprises about 50–70 wt. % $SiO_2$, 10–25 wt. % ZnO, 5–20 wt. % $K_2O$, 0–15 wt. % $Na_2O$, 0–8 wt. % $Li_2O$, 0–8 wt. % BaO, 0–5 wt. % $ZrO_2$, 0–3 wt. % CaO, and 0–2 wt. % MgO.

21. The sealant of claim 18, wherein said filler material is present at least at about 10 wt. %.

* * * * *